US011780100B2

(12) United States Patent
Gu et al.

(10) Patent No.: US 11,780,100 B2
(45) Date of Patent: Oct. 10, 2023

(54) FOUR-DIMENSIONAL-PRINTED PNEUMATICALLY ACTUATED FLEXIBLE ROBOTIC JOINTS

(71) Applicant: THE REGENTS OF THE UNIVERSITY OF CALIFORNIA, Oakland, CA (US)

(72) Inventors: Grace Xiang Gu, Berkeley, CA (US); Kahraman Gufran Demir, Berkeley, CA (US); Zhizhou Zhang, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 332 days.

(21) Appl. No.: 17/260,504

(22) PCT Filed: Sep. 13, 2019

(86) PCT No.: PCT/US2019/051014
§ 371 (c)(1),
(2) Date: Jan. 14, 2021

(87) PCT Pub. No.: WO2020/056254
PCT Pub. Date: Mar. 19, 2020

(65) Prior Publication Data
US 2021/0268663 A1 Sep. 2, 2021

Related U.S. Application Data (60) Provisional application No. 62/731,264, filed on Sep. 14, 2018.

(51) Int. Cl.
*B25J 15/00* (2006.01)
*B33Y 80/00* (2015.01)
(Continued)

(52) U.S. Cl.
CPC ........... *B25J 15/0009* (2013.01); *B25J 9/142* (2013.01); *B25J 15/10* (2013.01); *B25J 19/007* (2013.01); *B25J 19/0029* (2013.01); *B33Y 80/00* (2014.12)

(58) Field of Classification Search
CPC . B25J 15/009; B25J 15/10; B25J 9/142; B25J 19/0029; B25J 19/007; B33Y 80/00
See application file for complete search history.

(56) References Cited

U.S. PATENT DOCUMENTS

| | | | | |
|---|---|---|---|---|
| 5,156,081 A | * | 10/1992 | Suzumori | ................ B25J 15/12 92/92 |
| 7,086,322 B2 | * | 8/2006 | Schulz | .................. F15B 15/103 92/45 |

(Continued)

FOREIGN PATENT DOCUMENTS

JP    10175183 A    6/1998

OTHER PUBLICATIONS

International Search Report and Written Opinion, PCT/US2019/051014, dated Nov. 10, 2019, 11 pages.

*Primary Examiner* — Stephen A Vu
(74) *Attorney, Agent, or Firm* — McCoy Russell LLP (57) ABSTRACT

A robotic grasping system can include a three-dimensional (3D) printed joint, a stiff portion coupled with the 3D-printed joint, internal tubes within the 3D-printed joint, a bellows coupled with the 3D-printed joint and at least one of the internal tubes, and a pressure source configured to cause the internal tubes to pressurize or depressurize the bellows.

14 Claims, 6 Drawing Sheets

(51) Int. Cl.
*B25J 9/14* (2006.01)
*B25J 15/10* (2006.01)
*B25J 19/00* (2006.01)

(56) References Cited

U.S. PATENT DOCUMENTS

| | | | |
|---|---|---|---|
| 9,821,475 B1 | 11/2017 | Lynn et al. | |
| 10,189,168 B2 * | 1/2019 | Lessing | B25J 15/0071 |
| 10,562,180 B2 * | 2/2020 | Telleria | F16J 3/04 |
| 10,576,640 B2 * | 3/2020 | Knopf | B25J 15/12 |
| 2003/0110938 A1 * | 6/2003 | Seto | B25J 15/12 |
| | | | 92/92 |
| 2012/0025553 A1 | 2/2012 | Fischer et al. | |
| 2016/0375590 A1 | 12/2016 | Lessing et al. | |

* cited by examiner

FOUR-DIMENSIONAL-PRINTED PNEUMATICALLY ACTUATED FLEXIBLE ROBOTIC JOINTS

CROSS REFERENCE TO RELATED APPLICATIONS

This application is a 371 of International Application No. PCT/US2019/051014, filed Sep. 13, 2019, which claims priority to and the benefit of U.S. Provisional Application No. 62/731,264, filed Sep. 14, 2018, the contents of both of which are incorporated herein by reference in their entirety.

BACKGROUND

Grasping is fundamental to how people interact with the physical world. Mimicking human-like grasping is generally desirable for various applications in robotics, medicine, and manufacturing, among many other fields. Conventional electromechanical grippers may offer high precision and robust actuation but they disadvantageously require complex coordination between electrical and mechanical systems and are thus difficult to custom tailor and assemble (e.g., because they consist of multiple parts).

Additive manufacturing might be able to overcome some of these limitations in conventional grippers. Specifically, the additive manufacturing of parts that can change shape or property under external stimulus, a process that is commonly known as four dimensional (4D)-printing, can reduce complex electromechanical systems with many moving parts to a single print job. However, conventional 4D-printed grippers undesirably suffer from any or all of the following: slow response time, narrow actuation range, low dexterity, and ambiguous control.

Rigid conventional grippers are highly developed and can be seen in assembly lines, surgical tools, manipulators, etc., which even extends to the microscale. Some people have designed a compliant gripper that is able to capture objects at different shapes on a millimeter scale and does so smoothly with high force sensibility, but its fabrication undesirably includes complex steel structures, strain gauges, motors, and a controller. By contrast, 4D-printing as an emerging technology shows a promising future for next generation grippers by potentially having the ability to integrate all of the functions and components within a single print cycle.

Currently, the major 4D-printed grippers can be categorized into shape memory polymer (SMP) or pneumatic (also referred to herein as hydraulic) designs. SMP designs typically make use of the volume shrinkage of the material when heated above the glass transition temperature to control the gripper jaws.

Some people have designed an actuator by printing Conductive Graphene polylactic acid (PLA) Filaments on a sheet of paper. The filaments can be deformed when heated by a current to the glass transition temperature. The stress mismatch between the paper and filaments thus bends the whole jaw to a degree determined by the printed pattern on the paper.

Figure 1:
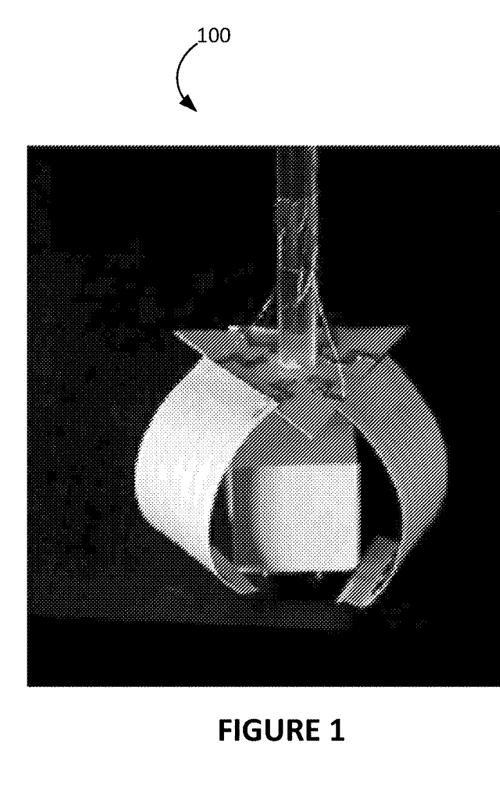
FIG. 1 illustrates an example of a conventional shape memory polymer gripper.

FIG. 1 illustrates an example of a conventional soft gripper 100, which can be fabricated and customized. The drawbacks of this gripper 100, however, are slow response times restricted by the heat transfer process, low repeatability, and being limited to only two folding states for each printed jaw.

Figure 2:
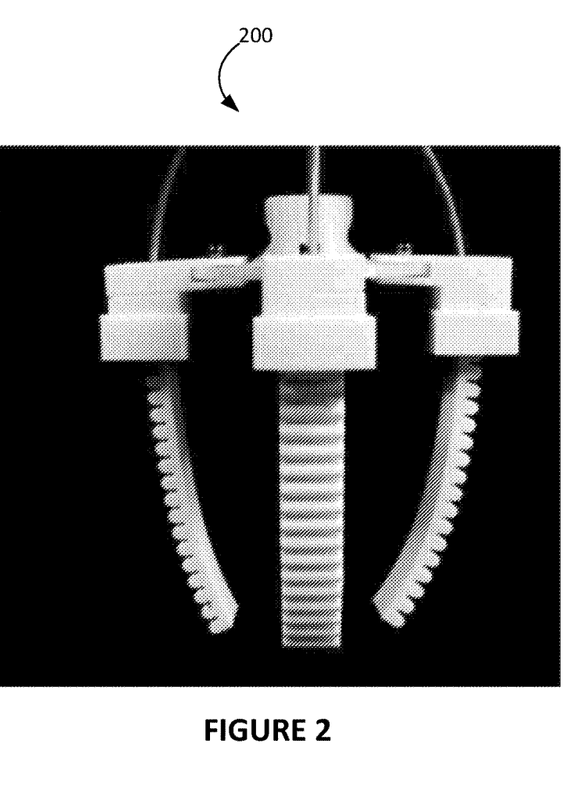
FIG. 2 illustrates an example of a conventional pneumatic gripper.

FIG. 2 illustrates an example of a conventional neumatic (e.g., hydraulic) soft gripper 200, which can exhibit fast and robust response times. In this example, the whole gripper consists of four corrugated columnar jaws. Air pipes are embedded into the jaws from the bottom and, once the jaws are pressurized by air, the hidden structures are forced to expand which drives the bending of the jaws into curves.

The same mechanism is applied to hydraulic grippers, which are driven by fluid. In contrast to the binary control of SMP grippers, these pneumatic grippers can be roughly controlled to stay anywhere between their free state and clenched state. However, these designs disadvantageously leave little customizability space for users due to the restricted actuation angle of the joints.

Thus, there remains a need for grippers that can maintain the high control and dexterity of conventional grippers while benefiting from the high customizability and unit body simplicity of additive manufacturing.

SUMMARY

Implementations of the disclosed technology are generally directed to a four-dimensional (4D)-printed gripper that is arranged to maintain the high control and dexterity from conventional grippers while benefiting from the high customizability and unit body simplicity of additive manufacturing. Certain implementations may include an additively manufactured pneumatically actuated joint having high dexterity, customizability, and control.

Implementations of the disclosed technology may include a four-dimensional (4D)-printed pneumatically actuated soft joint that may advantageously have high actuation range, controlled folding degree, high customizability, and streamlined assembly driven by air pressure. Spherical bellow structures whose peaks and valleys are printed with flexible materials may be adhered to both sides of the joint for folding.

The unique joint design, ease of assembly, and wide material palette for this pneumatically actuated material can be applied to a wide variety of robotic actuation mechanisms. A versatile gripper can be made to pick up a variety of objects (e.g., delicate, soft, or hard) for a number of diverse applications in medical, aerospace, and defense industries, among other fields.

DETAILED DESCRIPTION

Implementations of the disclosed technology can include, but are not limited to, fabrication of robotic gripping mechanisms and devices using techniques such as three-dimensional (3D)-printing, design of smart joint structures, and pneumatic stimuli for actuation.

3D Printing

In certain embodiments, a joint for a robotic grasping device can be printed using a multi-material Fused Deposition Modeling (FDM) printer. Low-cost materials may be utilized to completely construct the joint and its surrounding structure. These materials may include a combination of rigid materials (e.g., PLA, Acrylonitrile Butadiene Styrene (ABS), polycarbonate (PC), and polyvinyl chloride (PVA)) and flexible materials like thermoplastic polyurethane (TPU).

In alternative implementations, different stiff materials may be used in different areas of the joint, e.g., depending on the material properties needed. For example, for areas where there are higher stresses, PC material could be used and, in other areas, cheaper PLA or ABS materials could be used. This may provide assistance in terms of minimizing the cost of the parts, for example. In such embodiments, PVA may be the dissolvable support material.

Among the various significant advantages of 3D-printing the joint structure is the reduction or outright elimination of any need to assemble parts. This can be fully appreciated when considering the meticulousness of contemporary motorized prosthetics.

Another significant advantage includes the immense customizability of the design that allows for the personalization of prosthetics or the design tuning of industrial robotic grippers for handling and interacting with a vast range of objects.

Furthermore, the utilization of flexible materials as joint pivots advantageously makes for a durable device, which typically leads to fewer maintenance requirements (such as little to no lubrication needed and no bearing wear, for example) when compared to traditional hinged devices.

Joint Design

In certain implementations, a joint may be actuated through the pressurization and depressurization of bellows that are positioned or otherwise located opposite to each other in the plane of motion. The bellows can be designed to fit in complex geometries, thus allowing for high articulation and dexterity that traditional electromechanical joints cannot easily achieve.

Figures 3, 4:
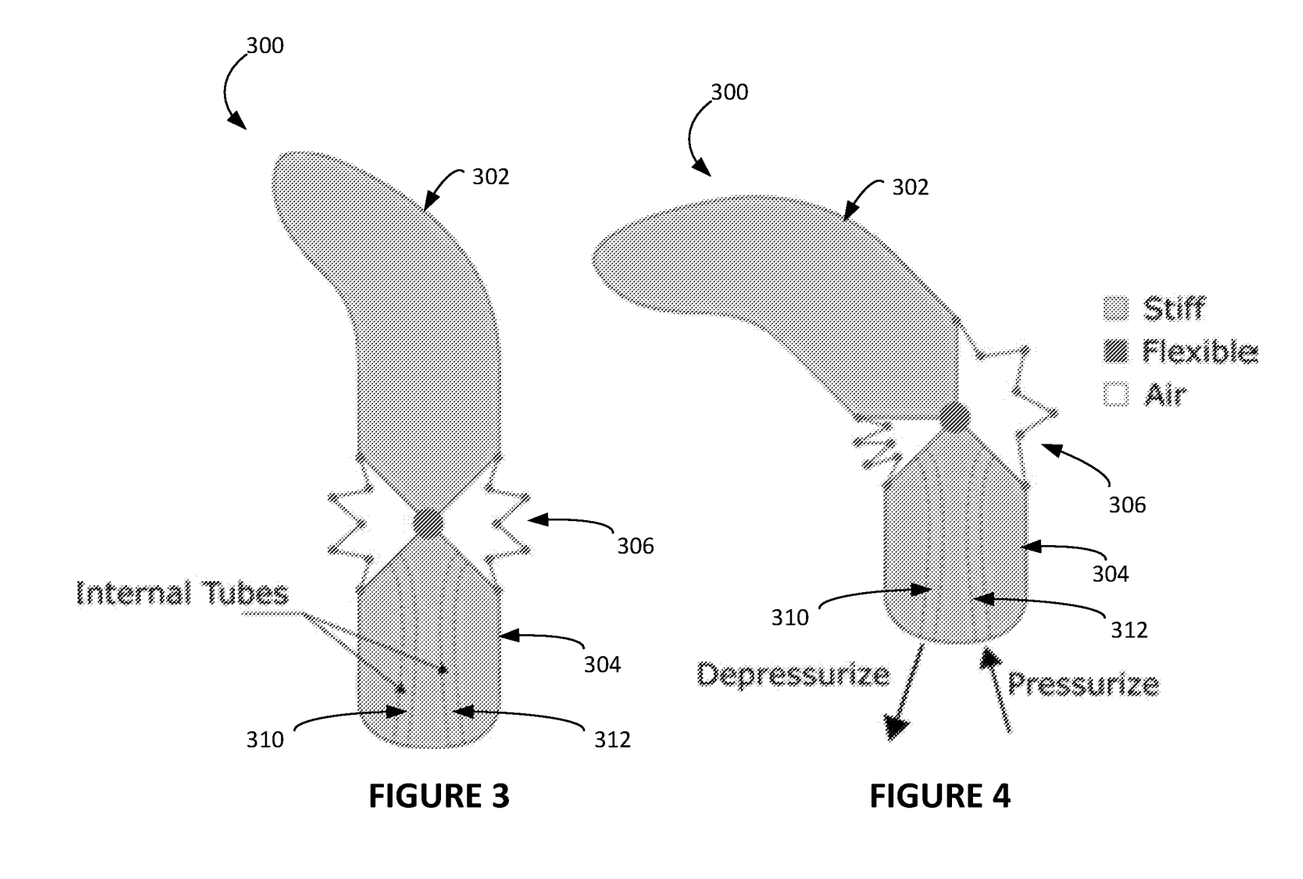
FIG. 3 illustrates a first example of a schematic of structural characteristics of a pneumatic joint in accordance with certain implementations of the disclosed technology.
FIG. 4 illustrates a second example of a schematic of structural characteristics of the pneumatic joint in accordance with certain implementations of the disclosed technology.

FIGS. 3 and 4 together illustrate an example of structural characteristics of a pneumatic joint 300 in accordance with the disclosed technology, more particularly embodiments of the joint concept in the plane of motion. In the example, the joint 300 includes two stiff portions 302 and 304 and a flexible portion 306 that may be configured to allow the joint 300 bend in various directions, for example.

The structure of the joint 300 may be modeled for an optimal or required bending direction, range, and force. The rigid structure may be designed to accommodate the moving pneumatic structure, and suitable adhesion between stiff and flexible materials may be ensured by way of using interlocking techniques, for example.

Pneumatics

In certain embodiments, pneumatic tubes 310 and 312 may be routed through the structure to accommodate the joint 300 rather than sticking out of the side, thereby allowing for a natural and minimalistic aesthetic. A system may consist of compact valves that are placed strategically in and around the joint's surrounding structures. The combination of the valves and a single pressure source advantageously allows for a highly compact and efficient device. By contrast, conventional motorized prosthetics require multiple motors, e.g., one for each prosthetic.

Four-dimensional (4D)-printed pneumatically actuated flexible joints in accordance with the disclosed techniques may advantageously provide a wide range of motion, quick actuation, functional actuation torque, and adaptable design characteristics.

Wide Range of Motion

Designs in accordance with the disclosed techniques may advantageously enable a wide range of articulated motion and multiple degrees of freedom. In contrast, conventional printed gripper designs do not implement articulated joints, which significantly limits the bending angles and dexterity of the device.

Quick Actuation

The use of pneumatics in the disclosed techniques advantageously allows for quick actuation and fast response times, which are generally only limited by the pressure controller system. In some studies, conventional grippers that have been three-dimensional (3D)-printed with SMPs had response times in orders of minutes. However, in an industrial setting, immediate responses are more desirable.

Functional Actuation Torque

In certain embodiments, the design of the joint may be easily and quickly modified to produce larger bending torques as needed. Calculations of a joint that is sized similarly to a join in a human finger may advantageously produce an estimated 0.3 Nm torque around the pivot of the joint, for example.

Adaptable Design Characteristics

In certain embodiments, the design of the joint can be modified to produce different torques. The parameters that affect the torque output can be easily adjusted due to their simplicity (e.g., pressure input, length of bellow elements, number of bellows, etc.). In certain embodiments, these parameters may be thoroughly studied to produce optimal designs with multifunctional capabilities.

Analytical Evaluation

Figure 5:
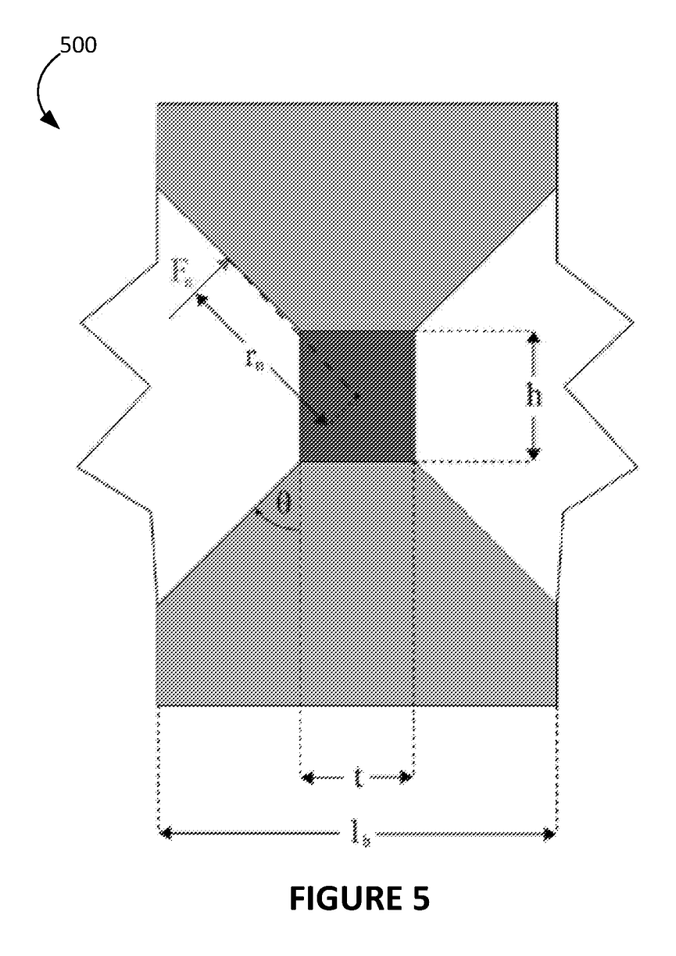
FIG. 5 illustrates an example of a diagram representing certain design variables pertaining to certain implementations of the disclosed technology.

FIG. 5 illustrates an example of a diagram 500 representing certain design variables pertaining to certain implementations of the disclosed technology. The bending torque may be estimated through the following equations:

The force, $F_n$, from the pressure is:

$$F_n = 2P\ d\ \sin(\theta)(l_b - t)$$

The moment arm, $r_n$, of $F_n$ is:

$$r_n = \sqrt{\frac{1}{4}\left(h + \frac{l_{b-t}}{2\tan(\theta)}\right)^2 + \frac{(l_{b-t})^2}{16}}$$

The bending moment, $M_n$, is:

$$M_n = F_n r_n$$

FIG. 5 also illustrates an example cross section of a two-dimensional (2D) pneumatic joint diagram which shows all of the variables that are in the equations presented above.

3D Model

Figure 6:
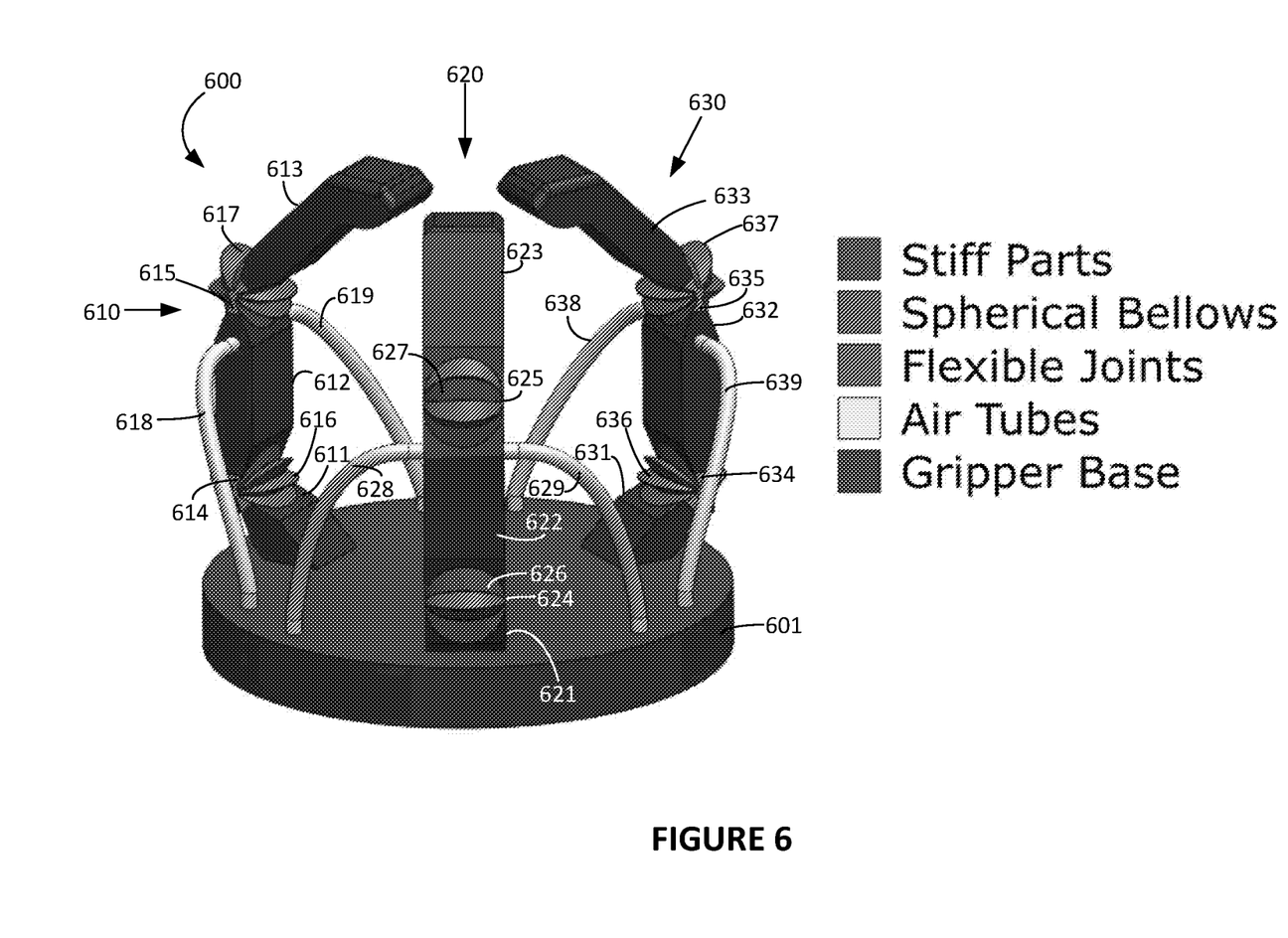
FIG. 6 illustrates an example of a 3D model of a gripper design utilizing joints in accordance with the disclosed techniques.

FIG. 6 illustrates an example of a 3D model of a gripper design 600 utilizing multiple joints in accordance with certain implementations of the disclosed technology. In the example, the gripper 600 includes three fingers 610, 620, and 630 coupled with a base portion 601. The fingers 610, 620, and 630 respectively include rigid parts 611-613, 621-623, and 631-633, lower flexible joints 614, 624, and 634, and upper flexible joints 615, 625, and 625. The three fingers 610, 620, and 630 also respectively include lower bellows 616, 626, and 636 and upper bellows 617, 627, and 637.

In certain embodiments, the operation range of each joint may exceed ±50° from the horizontal state. The bellows at the bottom may be pressurized by tubes printed within each finger, while external tubes 618-619, 628-629, and 638-639 may be required for the corresponding upper bellows 617, 627, and 637, respectively. The stiff parts 611-613, 621-623, and 631-633 may be highly customizable, e.g., for a wide library of replaceable materials, and also offer a large space for various geometries.

Figure 7:
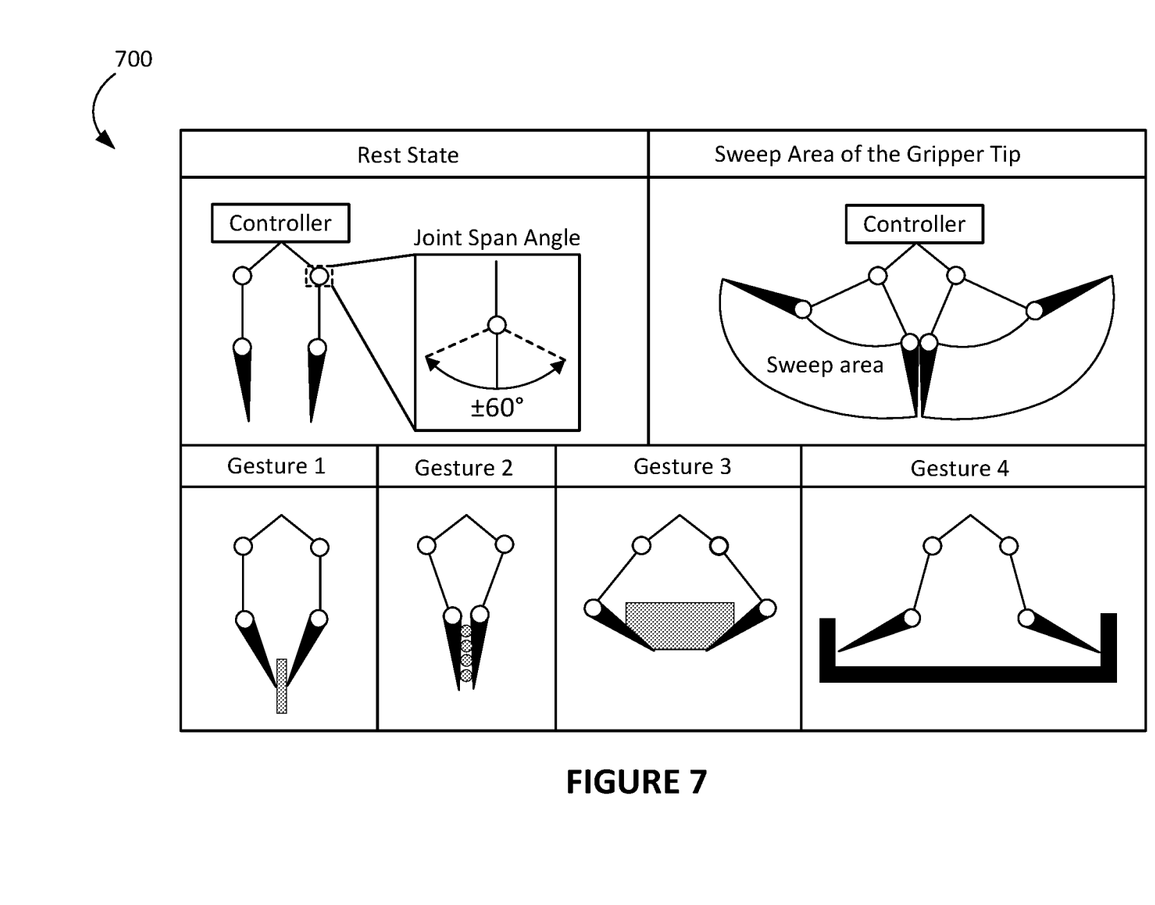
FIG. 7 illustrates a first example of various positions, orientations, and movements of a robotic gripping mechanism in accordance with certain implementations of the disclosed technology.

FIG. 7 illustrates an example 700 of various positions, orientations, and movements of a robotic gripping mechanism in accordance with certain implementations of the disclosed technology. In the example, the gripping mechanism has two gripping fingers and is configured to be controlled by a controller.

Each of the two fingers has three rigid portions and two flexible portions that allow for movement of at least the second-outermost and third-outermost portions of the fingers, which are substantially parallel to each other in a rest state but able to open to an angle of about 60 degrees. It will be appreciated, however, that the gripper may be arranged to allow for a greater, or smaller, angle of opening.

Because of the multiple joints, the gripper may have a very wide (e.g., up to or over 180 degrees) sweep area. The example provides four different gesture states that may be achieved by the gripper, but it will be appreciated that the number of possible gestures and movements for the gripper is virtually unlimited.

Figure 8:
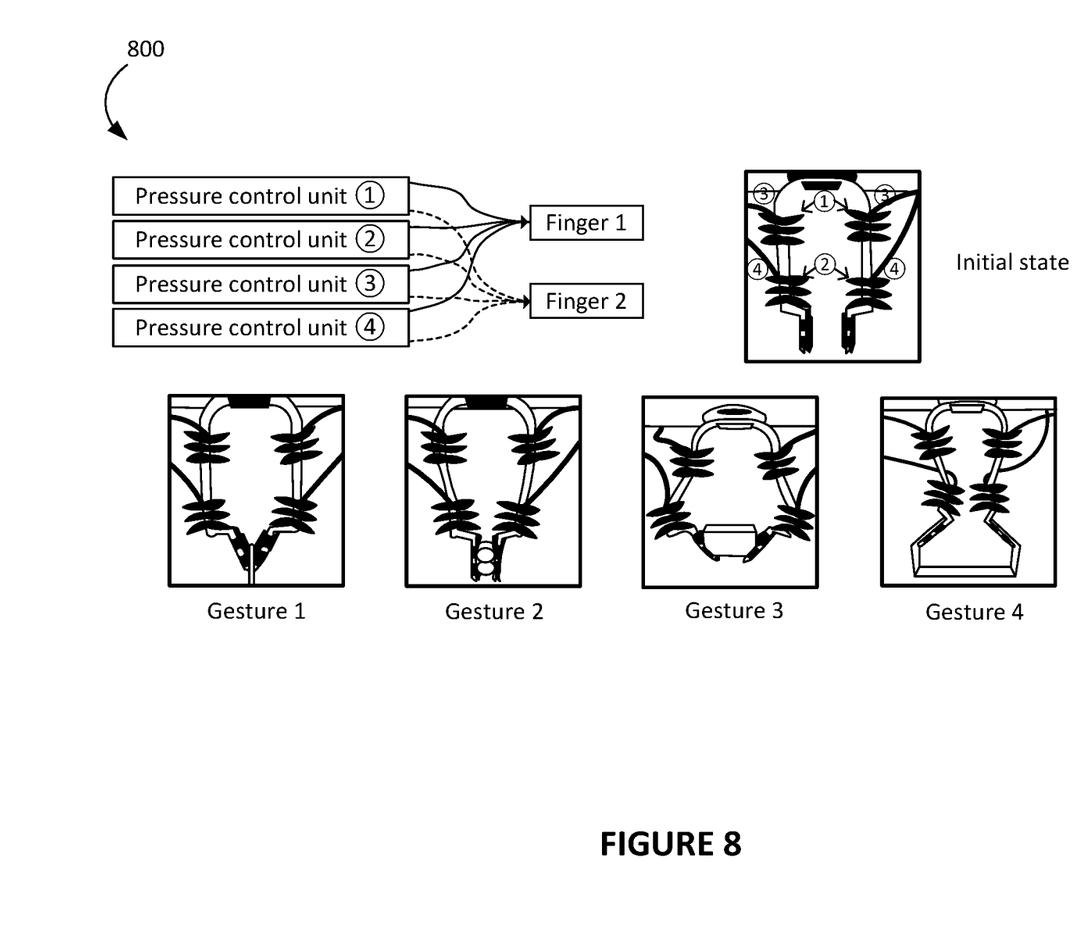
FIG. 8 illustrates a second example (experimental realization) of various positions, orientations, and movements of a robotic gripping mechanism in accordance with certain implementations of the disclosed technology.

FIG. 8 illustrates an example 800 of various positions, orientations, and movements of a robotic gripping mechanism in accordance with certain implementations of the disclosed technology. In the example, the gripping mechanism has gripping fingers that may each be moved and/or repositioned by way of pressure control units. While the example includes two fingers and four pressure control units, it will be appreciated that the number of fingers a gripper may have—as well as the number and type of pressure control units—are both virtually unlimited.

The example provides an initial state and four different gesture states that may be achieved by the gripping mechanism, but it will be appreciated that the number of possible gestures—as well as the number of movements, positions, and orientations—for the gripper are all virtually unlimited.

It will be appreciated that a pneumatically actuated joint in accordance with the disclosed technology, and thus devices and systems utilizing such a joint, not only overcome the various limitations in conventional gripping mechanisms but may also revolutionize the robotics field by: 1) lowering the cost of robotic products and services; 2) increasing the accessibility of robotic automation; 3) enabling new robotic applications; and 4) reducing maintenance requirements.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A robotic grasping system, comprising:
   a first three-dimensional (3D) printed joint;
   at least one first stiff portion coupled with the first 3D-printed joint;

a first plurality of internal tubes within the first 3D-printed joint;
at least one first bellows coupled with the first 3D-printed joint and at least one of the first plurality of internal tubes;
a pressure source configured to cause the first plurality of internal tubes to pressurize or depressurize the at least one first bellows;
a second 3D-printed joint;
at least one second stiff portion coupled with the second 3D-printed joint;
a first plurality of external tubes coupled with the second 3D-printed joint; and
at least one second bellows coupled with the second 3D-printed joint and at least one of the first plurality of external tubes.

2. The robotic grasping system of claim 1, wherein the at least one first bellows is configured to cause the at least one first stiff portion to move in a certain direction responsive to the at least one first bellows being pressurized or depressurized.

3. The robotic grasping system of claim 1, wherein the first 3D-printed joint is formed by a Fused Deposition Modeling (FDM) printer.

4. The robotic grasping system of claim 1, further comprising a plurality of valves with the first 3D-printed joint.

5. The robotic grasping system of claim 1, wherein the at least one second bellows is configured to cause the at least one second stiff portion to move in a certain direction responsive to the at least one second bellows being pressurized or depressurized.

6. The robotic grasping system of claim 1, wherein the second 3D-printed joint is formed by a Fused Deposition Modeling (FDM) printer.

7. The robotic grasping system of claim 1, further comprising:
a third 3D-printed joint;
at least one third stiff portion coupled with the third 3D-printed joint;
a second plurality of external tubes coupled with the third 3D-printed joint; and
at least one third bellows coupled with the third 3D-printed joint and at least one of the second plurality of external tubes.

8. The robotic grasping system of claim 7, wherein the at least one third bellows is configured to cause the at least one third stiff portion to move in a certain direction responsive to the at least one third bellows being pressurized or depressurized.

9. The robotic grasping system of claim 7, wherein the third 3D-printed joint is formed by a Fused Deposition Modeling (FDM) printer.

10. A robotic grasping system, comprising:
a first three-dimensional (3D)-printed joint;
a second 3D-printed joint;
at least one first stiff portion coupled with said first 3D-printed joint;
at least one second stiff portion coupled with said second 3D-printed joint;
a plurality of internal tubes within the first 3D-printed joint;
at least one first bellows coupled with at least one of said plurality of internal tubes;
a plurality of external tubes coupled with the second 3D-printed joint;
at least one second bellows coupled with at least one of said plurality of external tubes;
a first pressure source configured to cause the plurality of internal tubes to pressurize or depressurize the at least one first bellows; and
a second pressure source configured to cause the plurality of external tubes to pressurize or depressurize the at least one second bellows.

11. The robotic grasping system of claim 10, wherein the at least one first bellows is configured to cause the at least one first stiff portion to move in a certain direction responsive to the at least one first bellows being pressurized or depressurized.

12. The robotic grasping system of claim 10, wherein the at least one second bellows is configured to cause the at least one second stiff portion to move in a certain direction responsive to the at least one second bellows being pressurized or depressurized.

13. The robotic grasping system of claim 10, wherein the first and second pressure sources are the same pressure source.

14. The robotic grasping system of claim 10, wherein either or both of the first and second 3D-printed joints are formed by a Fused Deposition Modeling (FDM) printer.

* * * * *